United States Patent [19]

Petrelli

[11] Patent Number: 5,024,480
[45] Date of Patent: Jun. 18, 1991

[54] BODYWORK FOR AUTOMOBILES
[75] Inventor: Luigi Petrelli, Legnano, Italy
[73] Assignee: Alfa Lancia Industriale S.p.A., Arese, Italy
[21] Appl. No.: 522,066
[22] Filed: May 11, 1990

Related U.S. Application Data

[63] Continuation of Ser. No. 282,492, Dec. 12, 1988, abandoned.

[30] Foreign Application Priority Data

Dec. 24, 1987 [IT] Italy ............................ 23222 A/87

[51] Int. Cl.⁵ ............................................. B60J 10/08
[52] U.S. Cl. .................................... 296/146; 296/210; 49/485
[58] Field of Search ................. 296/146, 210; 49/485, 49/488

[56] References Cited

U.S. PATENT DOCUMENTS

| 2,576,354 | 11/1951 | Oswald | 296/210 |
| 2,624,614 | 1/1953 | Kramer | 296/146 X |
| 3,776,588 | 12/1973 | Sobajima et al. | 296/146 |
| 4,026,598 | 5/1977 | Koike | 296/146 |
| 4,348,046 | 9/1982 | Ohya | 296/146 X |
| 4,378,130 | 3/1983 | Shimizu | 296/146 X |
| 4,405,173 | 9/1983 | Piano | 296/146 |
| 4,457,111 | 7/1984 | Koike | 296/146 X |
| 4,475,765 | 10/1984 | Vogt et al. | 296/210 |
| 4,653,802 | 3/1987 | Watanabe et al. | 296/146 X |

FOREIGN PATENT DOCUMENTS

| 6116 | 1/1984 | Japan | 296/146 |
| 12415 | 1/1987 | Japan | 296/210 |
| 26117 | 2/1987 | Japan | 296/146 |

Primary Examiner—Margaret A. Focarino
Assistant Examiner—Andrew C. Pike
Attorney, Agent, or Firm—Charles A. Brown

[57] ABSTRACT

The bodywork is accomplished with longitudinal members of the passenger compartment, and with upper crosspieces of the doors, which can be adapted to different models of automobiles by means of the use of supplementary section bars. This is done according to whether the bodywork is accomplished with doors of traditional type, or with doors of the so-said "enveloping" type. To the longitudinal member or to the structure of the crosspiece of the door at least a supplementary section bar is fastened. In particular, it is welded and shaped as to at least partially seal the longitudinal chamber defined between the longitudinal member and the structure of the crosspiece.

4 Claims, 2 Drawing Sheets

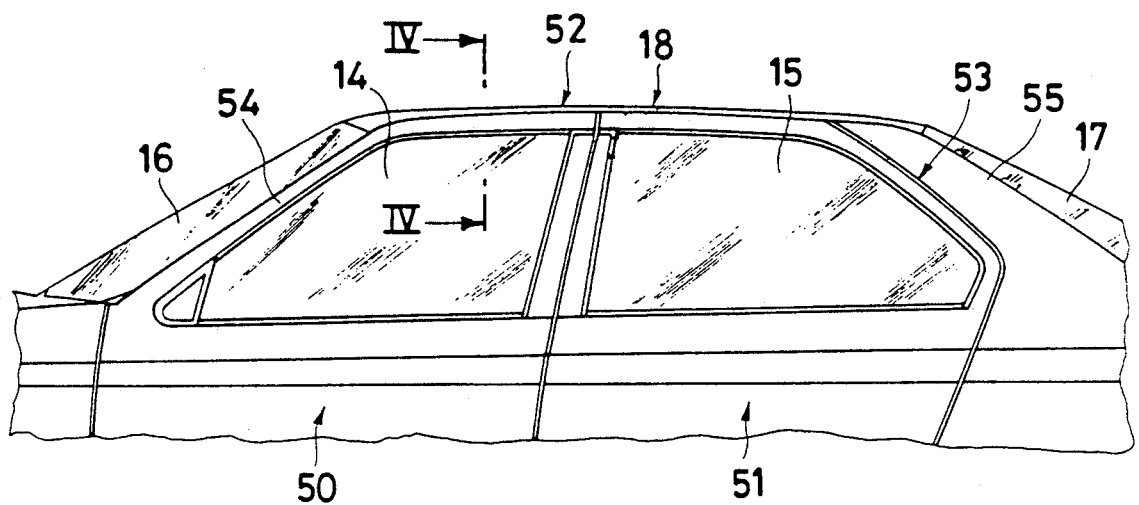
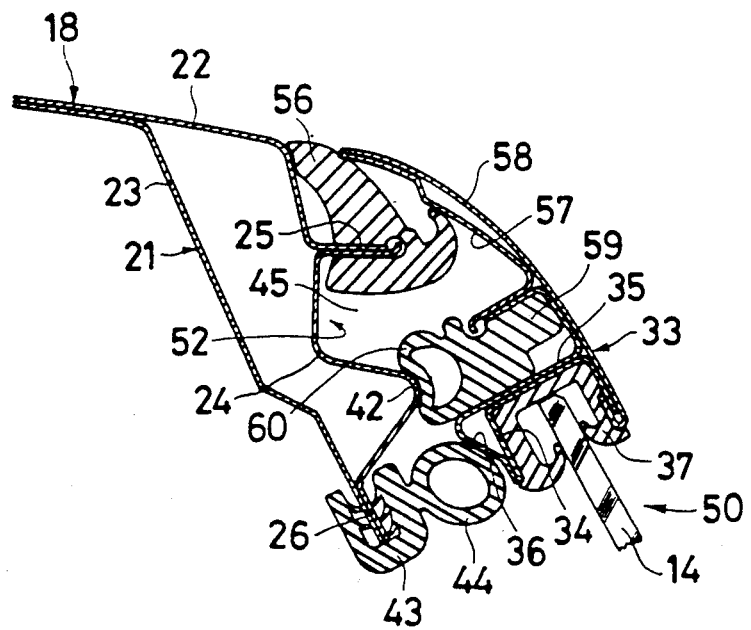

BODYWORK FOR AUTOMOBILES

This application is a continuation of application Ser. No. 282,492, filed Dec. 12, 1988, now abandoned.

BACKGROUND OF THE INVENTION

1. Field of the Invention

The present invention relates to a bodywork, for automobiles. The rims of the doors, and the doors have a structure which makes it possible for both traditional solutions, with doors enclosed inside their rims, and less usual solutions, with doors of the so-said "enveloping" type, to be accomplished.

2. Description of the Related Art

A bodywork having these characteristics was already proposed in European patent application No. 0193499. In it, for the rims, or rings, of the doors, the adoption of a longitudinal member is proposed, which is adaptable to both door types, i.e., the traditional and the "enveloping" doors. In fact, the longitudinal member is provided with an upper, substantially horizontal, flange, on which an "L"-shaped gasket can be mounted, which performs the function of acting as a water drain channel, and is suitable to engage with a door of traditional type. Alternatively a "V"-shaped gasket can be mounted, which is suitable for engaging with a door of "enveloping" type, and is capable of forming a water drain channel, when the door is open.

In this case, a specific frame for each type of door is provided for, and the solutions proposed do not show common elements.

Furthermore, doors of traditional type are not faired. The conventional doors don't have a radius outline as in case of doors of "enveloping" type. Therefore, there is a less favorable solution regarding the aerodynamic resistance coefficient (Cx) and the noisiness of the car.

Finally, still in the case of doors of traditional type, the width of the available room inside the passenger compartment is reduced.

The purpose of the present invention is to provide a bodywork for automobiles which does not suffer from these limitations. Further it is the purpose to optimize the flexibility of manufacturing, and the performance of the car.

These results are obtained by means of a bodywork wherein the rims of the doors, and the frame of the doors show a common basic structure. The basic structure can be used both with doors of the traditional type, and with doors of the "enveloping" type.

In order to achieve differentiated solutions, supplementary section bars are provided which are suitable for combining with the basic structure of the door rims outdoor frames.

SUMMARY OF THE INVENTION

A bodywork according to the present invention has doors with door rims whichare formed, at their top, by longitudinal members provided with at least a substantially horizontal upper flange. The doors also have frames which are provided, at their top, with a crosspiece having a structure formed by at least a section bar with a substantially "C"-shaped cross section (a channel section). The channel is directed downwards, wherein the bodywork is characterized in that one of the longitudinal members and a crosspiece structure at a supplementary section bar is fastened together and shaped to at least partially seal the longitudinal chamber comprised between the longitudinal member and crosspiece structure.

According to a preferred solution, the frames of the doors are equipped at their top with a crosspiece. The crosspiece comprises a section bar with a substantially "U"-shaped cross section which is made integral with the section bar having a substantially "C"-shaped cross section.

In case the bodywork is designed with doors of the traditional type, the present invention provides for the supplementary section bar to be suitable for being fastened to the longitudinal member, and to have at least a wall with an arcuate cross section. This enables one to form a radius in the outer outlines of the longitudinal member and crosspiece.

In case the bodywork is designed with doors of the "enveloping" type, the present invention provides for the supplementary section bar to have a substantially "L"-shaped cross section (an angle section), and is suitable for being fastened to the crosspiece of the doors.

The proposed solution is endowed with the maximum number of common components, because it supplies a basic solution which can be used independently from the type of the doors, and is therefore adaptable to different models of automobiles.

Furthermore, it makes it possible to have an outer smooth, so-said "flush", profile in the areas of the side edges of the passenger compartment of the car. This is possible not only with doors of the "enveloping" type, but also with doors of the traditional type.

Finally, even with traditional doors, it makes it possible to provide a rather wide passenger compartment, as wide as a bodywork with the "enveloping" doors,

BRIEF DESCRIPTION OF THE DRAWING

Characteristics and advantages of the invention are now illustrated by referring to FIGS. from 1 to 4, wherein a preferred form of practical embodiment of the same invention is depicted.

FIG. 3 shows a partial side view of a car equipped with enveloping doors and having a bodywork also accomplished according to the invention;

FIG. 4 shows a partial view according to path IV—IV of FIG. 3.

DESCRIPTION OF THE PREFERRED EMBODIMENT

Figure 1:
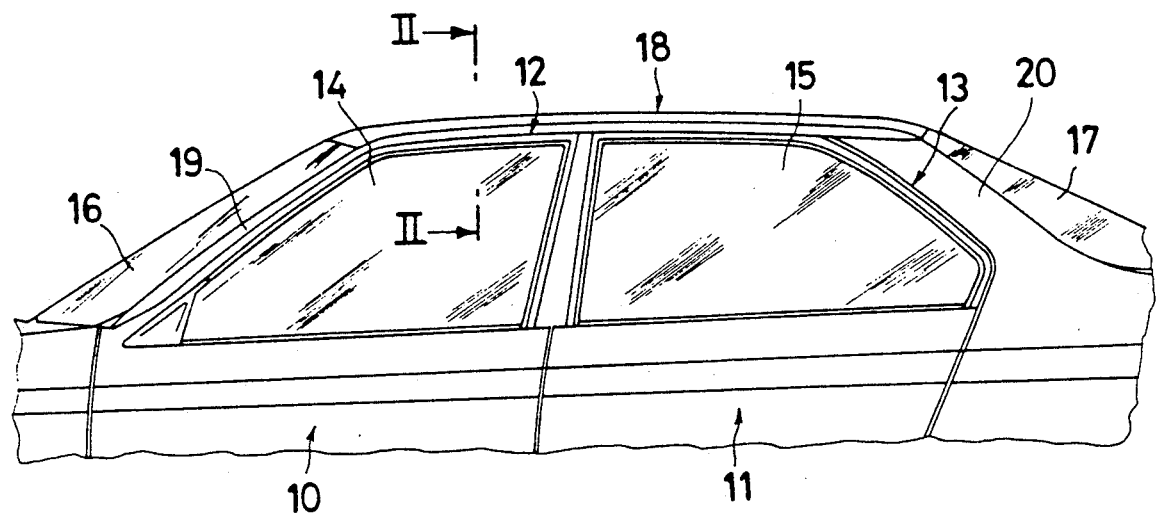
FIG. 1 shows a partial side view of a car equipped with traditional doors and having a bodywork manufactured according to the present invention.

In FIG. 1, the doors, generally indicated by the reference numerals 10 and 11, of a car, are partially shown. In this embodiment, the doors are of traditional type, encased inside their respective rims, generally indicated by the reference numerals 12 and 13.

The reference numerals 14 and 15, indicate the sliding glasses of doors 10 and 11. The windscreen and the rear window of the automobile are indicated by the reference numerals 16 and 17, and the passenger compartment of the car is indicated by the reference numeral 18.

The front upright and the rear upright of the bodywork of FIG. 1 are generally indicated by the reference numerals 19 and 20.

Figure 2:
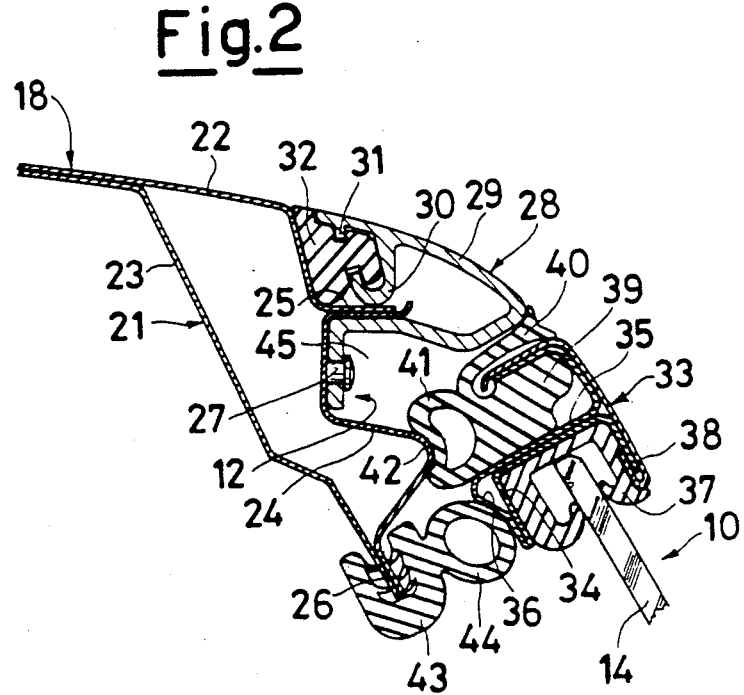
FIG. 2 shows a partially sectional view according to path II—II of FIG. 1.

By the reference numeral 21, a longitudinal member, visible in FIG. 2, is indicated, which connects the uprights 19 and 20.

The longitudinal member 21 is a closed cross-section box-type beam, composed by three walls of pressed steel plate, respectively indicated by the reference numerals 22, 23 and 24, welded to each other along their edges, in order to form a substantially horizontal flange 25, and a substantially vertical flange 26.

To the wall of steel plate 24, a supplementary section bar is fastened by means of rivets, like the one indicated by the reference numeral 27. The section bar is generally indicated by the reference numeral 28, and is formed by two walls comprising an outer wall and an inner wall, with an arcuate cross section.

The outer wall 29 of the section bar 28 is provided with a hook 30 and with a detent 31, which retain a gasket 32 located between the section bar 28 and the car's passenger compartment 18.

In FIG. 2, the upper crosspiece of the door frame 10 is visible. The upper crosspiece is provided with a structure generally indicated by the reference numeral 33. The structure 33 is composed by the steel plate section bars 34, 35, 38.

The section bar 34 has a substantially "C"-shaped cross section, with the channel being directed downwards. The channel houses a gasket 37 which receives the glass 14 (15).

The section bar 35 has a substantially "U"-shaped cross section. The channel is directed towards the interior of the automobile, and is provided with a small radial flange 36 constituting one single piece with the section bar 34.

The section bar 38, having a cross section of a substantially reverse-"L"-shape, is welded to the section bars 34 and 35, and acts as a strengthening, external-finishing panel.

The section bar 38 retains the gasket, generally indicated by the reference numeral 39, which is provided with a tongue 40, interposed between the crosspiece 33 and the supplementary section bar 28, and with a tubular portion 41, which comes into contact with a longitudinal bulge 42 of the wall 24 of the longitudinal member 21.

On the flange 26 a gasket is mounted, generally indicated by the reference numeral 43, which is provided with a tubular element 44, suitable for coming into contact with the crosspiece 33 of the door 10.

The supplementary section bar 28 and the gasket 32 seal the longitudinal chamber 45 disposed between the longitudinal member 21 of the passenger compartment and the upper crosspiece 33 of the door. The section bar 28 masks the flange 25 and has a wall 29 which forms a radius conforming with the outer wall outline of the longitudinal member 21, and the outer outline of the crosspiece 33.

Thus, in the region of the side edge of the passenger compartment 18, a flush outer profile is accomplished, which prevents air vortices from forming, and hence improves the aerodynamic characteristics and the silentness of the car.

With the above structure the position of doors 10 and 11 inside their rims 12 and 13 is particularly favorable for the comfort of occupants of the car, because the width of the passenger compartment can be just as large as it would be with doors of the "enveloping" type.

FIGS. 3 and 4 relate to another embodiment of a bodywork of an automobile with doors of the "enveloping" type. In FIGS. 3 and 4, the common components are indicated by reference numerals with a prime symbol.

By the reference numerals 50 and 51 the doors are generally indicated, which are of the "enveloping" type, and by the reference numerals 52 and 53 the rims of the doors are indicated. The front upright and the rear upright of the car are then generally indicated by the reference numerals 54 and 55.

In FIG. 4, the longitudinal member 21' is visible, which connects the uprights 54 and 55.

By the reference numeral 56 a gasket, having a substantially "V"-shaped cross section is indicated. The gasket 56 is mounted on the flange 25'.

In this case too, the structure 33' of the upper crosspiece of the door 50 is composed by the steel plate section bars 34', 35' and 36' as the upper crosspiece of doors 10 and 11 of FIGS. 1 and 2 is.

By the reference numeral 57, a section bar is indicated, which has a substantially "L"-shaped cross section (angle section), and is welded to the "U"-shaped bar 35', and by the reference numeral 58 a strengthening and finishing panel is indicated, which is welded to section bars 57 and 34'.

By the reference numeral 59, a gasket is then indicated, which is forced inside the section bar 35', and is provided with a tubular portion 60 which comes into contact with the bulge 42' of the wall 24' of the longitudinal member 21'.

The longitudinal chamber 45', positioned between the longitudinal member 21' and the upper crosspiece of the door 50 (51), is bounded at its top by the section bar 57 and by the panel 58, which also acts as a curved wall flush with the external outline of the same longitudinal member 21'.

From the disclosed examples, it results that the bodywork of FIG. 1, with doors of the traditional type, and that of FIG. 3, with doors of the "enveloping" type, are accomplished by starting from a common basic structure, which is the same in both cases, formed by the longitudinal members 21 and 21' of the passenger compartment, and by the structures 34, 35, 36 and 34', 35', 36' of the upper crosspiece of the doors (10 and 11, or 50 and 51).

Furthermore, the sealing gaskets (37, 43, 44, 37', 43', 44', 39, 40, 41 and 59, 60) between the longitudinal members and the door crosspiece are equal, or very similar, in both cases.

From that, considerable advantages result, owing to the simplification and the reduction in design and manufacturing costs, which can be achieved when different models of cars are accomplished.

I claim:

1. Bodywork for an automobile, the automobile having a plurality of doors, each door having a glass window panel, the bodywork comprising a longitudinal member, the longitudinal member having a plurality of steel plates which are welded together to form a box-type beam, one of said steel plates having a substantially horizontal upper flange extending towards the doors, each door having a rim, the rim of each door being sealable with the longitudinal member, the rim having a first crosspiece, the first crosspiece being a structure formed of at least one first section bar, the first section bar having a substantially "C"-shaped cross-section and extending downward to receive the glass window panel, a longitudinal chamber being positioned between the longitudinal member and the first crosspiece structure of each door, a supplemental section bar being positioned and shaped to partially seal the longitudinal chamber, a first sealing gasket for sealing the first crosspiece of each door with the longitudinal member, and a second sealing gasket for sealing the supplemental section bar with the longitudinal member, the supplemental section bar being secured to the longitudinal member, and the supplemental section bar having a wall with an arcuate cross-section and being curved to conform to outer outlines of the longitudinal member and the first crosspiece whereby aerodynamic resistance of the automobile is improved.

2. The bodywork according to claim 1, wherein the rim of each door has a second crosspiece, the second crosspiece being a structure formed of at least one second section bar, the second section bar having a substantially "U"-shaped cross section, and the first and second section bars of each door are integral with one another.

3. The bodywork according to claim 1, wherein the box-type beam of the longitudinal member includes three walls, one of the three walls having substantially horizontal upper flange, and another of the three walls having a substantially vertical flange.

4. The bodywork according to claim 3, wherein the remaining wall of the three walls of the longitudinal member has a longitudinal bulge.

* * * * *